March 15, 1949. E. HERBOLD ET AL 2,464,683
CYCLE LOCK
Filed April 10, 1947
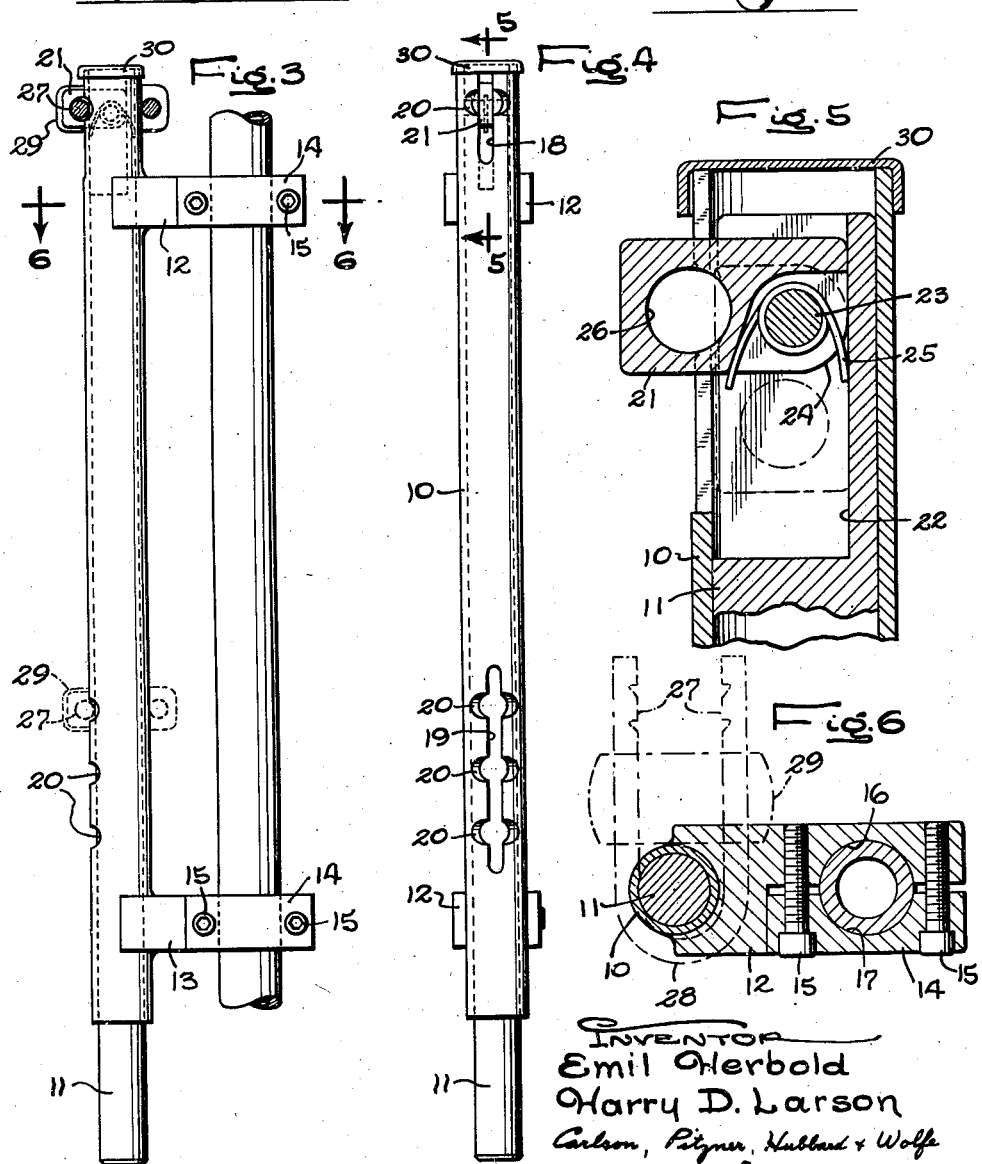
INVENTOR
Emil Herbold
Harry D. Larson
Carlson, Pitzner, Hubbard & Wolfe
ATTORNEYS Patented Mar. 15, 1949

2,464,683

UNITED STATES PATENT OFFICE 2,464,683

CYCLE LOCK

Emil Herbold and Harry D. Larson, Chicago, Ill.

Application April 10, 1947, Serial No. 740,554

6 Claims. (Cl. 70—235)

The present invention pertains generally to theft prevention devices for vehicles, and more specifically, to a mechanism for preventing the unauthorized use of a cycle type vehicle equipped with a supporting stand for maintaining it in a tilted position. The term "cycle type vehicle," as used herein, includes machines such as motorcycles, motor scooters, motorbikes and bicycles.

The problems faced by a cyclist who desires to leave his vehicle parked in public are considerably different from those of the motorist. The former must leave his vehicle in an exposed condition with its vital mechanism and controls, together with any disabling means therefor, readily accessible to any passer-by. Theft prevention means depending for their operation upon disabling the propulsion mechanism or some vital control afford little protection because they are easily reached and effectively by-passed by any thief possessing average mechanical ability. Since it is a common occurrence for an individual to tinker with a parked motorcycle because of starting difficulties, the movements of a thief evading the protective device are not likely to arouse suspicion.

Another problem of the cyclist arises from the necessity that he leave his vehicle supported on some kind of stand in a tilted or upright position. Such stands are sufficiently stable to support the cycle in the desired position, but afford little resistance to sidewise forces tending to knock the vehicle over. Anti-theft devices which depend for their operation upon something other than disabling the propulsion mechanism or machinery, such as stands which are lockable in the ground engaging position, are readily susceptible of being sprung, sawed, or otherwise neutralized because they are not primarily designed to withstand such attacks.

An object of the present invention is to provide a theft-prevention device for cycle type vehicles equipped with stands for supporting such vehicles in a tilted position, said device depending for its effectiveness upon maintaining a vehicle in the tilted position whereby it becomes impossible to ride, and exceedingly difficult to roll away or knock over.

Another object of the invention is to provide an anti-theft device for vehicles of the foregoing type and having its exposed parts hardened to resist the action of cutting tools, external bending forces, and shock.

A further object is to provide a locking device which may be readily clamped to the frame of any vehicle of the above mentioned type and which will be suitable for use with a conventional bicycle lock.

Still another object is to provide a cycle locking device characterized by simplicity, light weight, rapid and easy operation, and economical manufacture.

Further objects and advantages will become apparent as the following description proceds, taken in connection with the accompanying drawings, in which:

Figure 1 shows an embodiment of the present invention installed on a standard motorcycle and locked in the extended position to prevent the vehicle from being tilted upright.

Fig. 2 shows the device of Fig. 1 locked in the retracted or withdrawn position, permitting normal use of the motorcycle.

Fig. 3 shows the assembled device of Fig. 1 clamped to the frame tubing of a motorcycle, the telescoping rod being locked in the retracted position.

Fig. 4 is a side view of the device of Fig. 3 showing in detail the longitudinal slots and transverse grooves in the tube.

Fig. 5 is an enlarged sectional view of the upper end of the device taken along line 5—5 of Fig. 4 and showing the details of the pivotally mounted locking lug.

Fig. 6 is an enlarged sectional view through one of the mounting brackets, taken along line 6—6 of Fig. 3, the lock being indicated in broken lines.

Although a particular embodiment of the invention has been illustrated and described in some detail, there is no intention to thereby limit the invention to such embodiment, the intention being to cover all modifications and alternative constructions falling within the spirit and scope of the invention as expressed in the appended claims.

Referring more particularly to the drawing, an illustrative device embodying the invention is there shown comprising an elongated member 10 adapted to be clamped to the vehicle frame so as to extend in a generally vertical direction, together with a second elongated member 11 telescopically related to the first and lockable selectively in either an extended or a retracted position. Suitable locking means is associated with these members for precluding, in cooperation with an ordinary bicycle lock, relative sliding movement between them. When the supporting stand of the vehicle has been depressed and the machine inclined thereon, the second elongated member 11 may be extended until it contacts the ground and may be maintained in that condition by the use of the locking means, thus preventing the vehicle from being tilted upright. Conversely, when it is desired to operate the vehicle, the locking means may be readily disengaged and the member 11 easily withdrawn into the retracted position and held there by the engagement of the locking means permitting the normal use of the machine.

In the present instance, the first elongated member 10 comprises a tube having appropriate means for mounting the device on the vehicle frame in a generally vertical position. Preferably, this means consists of brackets 12 and 13, respectively, which are rigidly attached to the tube near its ends as by brazing or welding. As indicated in Fig. 6, each bracket is provided with a strap 14 and any suitable fastening means, such as socket head screws 15, for gripping tightly the tubing constituting the vehicle frame. Both the brackets and the straps have substantially semi-circular grooves 16 and 17 for this purpose. In order to render the device more tamperproof, the sockets in the heads of the screws 15 may be filled in with lead plugs, or the screws and the metal around them may be deformed as by staking with a center punch. To the same end, the grooves 16 and 17 may have knurled surfaces, not shown, for preventing axial displacement of the device along the vehicle frame tubing.

Telescopically related to and preferably slidable within the tube 10 is the second elongated member 11, which, in the illustrative embodiment, comprises a rod made of extremely hard, tough material to resist the action of cutting tools, external bending forces, and hammer blows. The diameter of the rod is selected with a view to providing a comfortable sliding fit within the tube. For the purpose of convenience in handling, the length of the rod is made slightly greater than that of the tube.

The locking means for preventing relative sliding movement between the elongated members 10 and 11 comprises cooperating elements carried by both members which, when in registry with each other, are engageable by the U-shaped shackle of the bicycle lock. Broadly, these elements may take any form convenient for use with the bicycle lock.

The preferred locking arrangement involves a pair of longitudinal slots 18 and 19 in the tube, each slot having one or more transversely extending, curved grooves 20. A cooperating element is associated with the rod 11 and, as shown in Fig. 5, comprises a small hardened lug or tab 21 pivotally mounted at the upper end of the rod. The lug 21 fits into a slot 22 on the center line of the rod, being retained therein by a dowel pin 23 driven through a diametrical bore in the rod, and is of suitable width to pass freely through either of the slots 18 or 19 upon rotation about its pivot point. The extent of the pivotal movement of the lug 21 is limited to approximately 90° by the shape of its inner profile. This is accomplished by rounding off the lower corner to create a surface 24 having its center of curvature at the pivot point of the lug. Spring means 25 may be optionally provided for urging the lug 21 upwardly and outwardly. Near its outer end, the lug has a transverse bore 26 of suitable size to receive one leg 27 on shackle 28 of bicycle lock 29. The radius of the bore 26 is substantially equal to the radius of curvature of the grooves 20 in the tube 10.

As an added precaution against tampering, a stamped sheet metal cap 30 is firmly affixed to the upper end of the tube 10 as by welding, brazing, or riveting. The cap also affords limited protection against the weather for the parts enclosed within the tube.

In operation, the rod 11 is moved within the tube 10 until the lug 21 is in alinement with either of the slots 18, 19 in the tube, the selection of the slot depending upon whether the rod is to be secured in the extended or the retracted position. When this has been done, the lug or the tab 21 may be drawn manually until it rocks upwardly and outwardly to a point where it projects through the wall of the tube 10. If the spring means 25 is provided, this movement will be accomplished automatically as soon as the lug becomes alined with either of the slots. Once the lug has been caused to project through the selected one of the slots, the rod 11 is shifted axially a slight amount until the bore 26 in the lug 21 is brought into registration with one of the grooves 20 in the tube. The rod may then be positively secured in the position corresponding to that particular groove by applying the lock 29 to the tube, inserting the leg 27 of the lock shackle through the alined bore and groove.

In keeping with the principal objects of the invention, the dimensions of the major parts of the device are so proportioned that the telescoping member 11, when in the extended position, would have to project below the ground plane in order to stand the cycle upright. Stated another way, the telescoping member, in the extended position, projects below the lower course of the vehicle wheels.

It can now be readily seen that when a vehicle equipped with the device of the present invention is parked and locked in the tilted position, the unauthorized use of the machine is effectively precluded in a manner consistent with the above mentioned objects. While it is true that a would-be thief might fold up the stand and attempt to wheel the cycle away, he would have to hold the vehicle at a sufficient angle of tilt for the extended member 11 of the device to clear the ground. This would necessitate his bearing a large proportion of the weight of the machine with consequent awkwardness and slowness in maneuvering. To these difficulties, would be added the considerable mental hazard of undue conspicuousness.

In addition to the foregoing, it will be appreciated that the device also serves effectively to minimize the possibility of having the vehicle knocked over while parked. This is achieved because the theft prevention device affords resistance to any side thrust tending to rock the machine in a direction away from its supporting stand.

We claim as our invention:

1. A locking device for cycle type vehicles equipped with supporting stands for maintaining them in a tilted position, comprising, in combination, an elongated tube having longitudinal slots therein and tangential grooves intersecting the slots, brackets attached to said elongated tube and adapted to clamp the device to the vehicle in a generally vertical direction, an elongated rod telescopically inserted in said tube for selective longitudinal adjustment into and out of an extended position beyond the lower courses of the vehicle wheels, a pivotally mounted locking lug attached to said rod and having a transverse bore and susceptible, when projecting through one of said longitudinal slots with said transverse bore in registration with one of said tangential grooves, of engagement with the shackle of a conventional bicycle lock to positively secure said rod in said extended position.

2. A locking device for cycle type vehicles equipped with supporting stands for maintaining them in a tilted position, comprising, in combination, a hollow tube having alined longitudinal slots therein, mounting means attached to said hollow tube and adapted to clamp the device to the vehicle frame in a generally vertical direction, a hardened rod slidably and adjustably related to said tube, a hardened locking lug pivotally attached to said rod and, when in registry with one of said slots in said tube, projectable therethrough for engagement with the shackle of a conventional bicycle lock to positively secure said rod in a withdrawn position with respect to said tube, and, when in registry with another of said slots, projectable therethrough for engagement with the shackle of a conventional bicycle lock to positively secured said rod in an extended position with respect to said tube.

3. A device for preventing the unauthorized use of a two-wheeled cycle equipped with a folding stand for supporting it in a tilted position, comprising, in combination, an elongated tube having openings therein, mounting means for clamping the device to the frame of the cycle, a rod slidably housed within said tube and lockable in a retracted position and in an extended position wherein said rod projects below the plane corresponding to the lower courses of the wheels, a locking lug pivotally attached to said rod and projectable through any of said openings in said tube, the free end of said lug having a hole therein to receive the shackle of a conventional bicycle lock, spring means for urging said lug about its pivot on said rod and causing said lug to project through the openings in said tube for ready engagement with said bicycle lock.

4. A device for preventing the unauthorized use of a two-wheeled cycle equipped on one side with a folding stand for supporting it in a tilted position, comprising, in combination, a depending elongated tube having spaced alined longitudinal slots opening through one side wall and formed with transverse grooves in the outer periphery extending across said slots, mounting brackets unitary with said tube and disposed near the ends thereof for rigid attachment to the frame of the cycle, a telescoping rod slidably housed within said tube for adjustment selectively into a retracted position permitting normal use of the cycle or into any one of a plurality of extended positions wherein said rod projects below the plane corresponding to the ground level when the cycle is upright, a locking lug pivotally attached to the upper end of said rod and being fully retractable within said tube and projectable therefrom through said slots when in registry therewith, the free end of said lug having a hole therein movable into registry with any of the grooves to receive the shackle of a conventional bicycle lock, and spring means for pivotally urging said lug outwardly when in alinement with either of said longitudinal slots to project therethrough.

5. In a locking device for cycle type vehicles, the combination comprising a hollow tube having longitudinal slots and shallow tangential grooves intersecting said slots, a rod telescopically related to said tube and slidable therein, locking means adapted for cooperative engagement with the shackle of a conventional bicycle lock, said means including a projectable locking lug pivotally attached to said rod and having a hole in its free end for registry with said tangential grooves, said lug being operable, when in registry with one of said longitudinal slots, to project therethrough bringing said hole into registry with one of said tangential grooves, whereby said rod may be positively secured in a fixed position relative to said tube by the passage of the lock shackle through the alined hole and groove.

6. A theft prevention device for a two-wheeled cycle equipped with a folding stand for supporting it in a tilted position, comprising, in combination, an elongated tube having alined longitudinal slots therein, means attached to said tube and adapted to clamp the device rigidly to the frame of any vehicle of the foregoing type, a lockable telescoping rod adapted to depend from the lower end of said tube to an extent which prevents the cycle from being tilted upright, a locking tab pivotally attached to said rod and cooperable with the shackle of a conventional bicycle lock when projected through one of said longitudinal slots in said tube, said rod being positively secured in the extended position by engagement with the shackle of said lock.

EMIL HERBOLD.
HARRY D. LARSON.

REFERENCES CITED

The following references are of record in the file of this patent:

UNITED STATES PATENTS

| Number | Name | Date |
|---|---|---|
| 566,023 | Saxton | Aug. 18, 1896 |
| 599,607 | Hewitt | Feb. 22, 1898 |

FOREIGN PATENTS

| Number | Country | Date |
|---|---|---|
| 653,585 | France | Nov. 9, 1928 |